3,337,295
STANNOUS HEXAFLUOROZIRCONATE
Wayne E. White, Tulsa, Okla., and Albert W. Jache, North Haven, Conn., assignors to Ozark-Mahoning Company, Tulsa, Okla., a corporation of Delaware
No Drawing. Filed Feb. 8, 1965, Ser. No. 431,173
1 Claim. (Cl. 23—88)

This invention relates to methods of preparing stannous hexafluorozirconate and refers more particularly to such methods of preparation wherein a source of stannous tin and a source of zirconium are dissolved or reacted in substantially anhydrous hydrogen fluoride.

Stannous hexafluorozirconate (tin II) (stannous tin) (hexafluorozirconate) has the formula $SnZrF_6$.

The products of the invention have been found to be useful in oral compositions for caries prophylaxis. Thus, for example, they would be used and useful in such products as dentifrices, mouth washes, dental prophylaxis pastes and topical solutions. It appears that this compound reduces the acid solubility rate of dental enamel.

An object of the invention is to provide novel and advantageous methods of preparation of the compound stannous hexafluorozirconate.

Another object of the invention is to provide a variety of methods adapted to the commercial production of high quality stannous hexafluorozirconate.

Another object of the invention is to provide methods of preparing stannous hexafluorozirconate by reacting a source of stannous tin with a source of zirconium in a medium of anhydrous hydrogen fluoride.

Another object of the invention is to provide methods of preparing stannous hexafluorozirconate using as a source of zirconium, zirconium chlorides which produce as one reaction product, the by-product of hydrochloric acid, the latter not soluble in the system of reaction and thereby easily removable therefrom.

Another object of the invention is to provide methods of producing stannous hexafluorozirconate utilizing as a source of stannous tin either powdered metallic tin, anhydrous stannous chloride, hydrated stannous chloride, stannous fluoride or stannous oxide, but preferably the metal, the anhydrous chloride or the fluoride.

Another object of the invention is to provide methods of producing stannous hexafluorozirconate wherein the source of zirconium may be either finely divided metallic zirconium, zirconium tetrachloride, zirconium tetrafluoride, zirconium oxide, hydrated zirconium oxide or zirconium oxychloride but is preferably the tetrachloride or the oxide.

Another object of the invention is to provide means and methods for producing stannous hexafluorozirconate from numerous varieties of sources of stannous tin including metallic tin, anhydrous stannous chloride, hydrated stannous chloride, stannous fluoride and stannous oxide and a variety of zirconium sources including any one of metallic zirconium, zirconium tetrachloride, zirconium tetrafluoride, zirconium oxide, hydrated zirconium oxide or zirconium oxychloride, all of said sources of stannous tin and zirconium soluble or reactive in substantially anhydrous HF to give stannous hexafluorozirconate as a reaction product.

Another object of the invention is to provide several alternative methods of preparing stannous hexafluorozirconate wherein each such method of preparation represents a commercially feasible operation, one which will yield stannous hexafluorozirconate at a cost comparable to present costs of stannous fluoride, said methods producing a high purity product.

In general, our methods of preparing stannous hexafluorozirconate comprise reacting a source of stannous tin comprising one of the class of metallic tin, anhydrous stannous chloride, hydrated stannous chloride, stannous fluoride and stannous oxide (but preferably the metal, the anhydrous chloride or the fluoride) with a source of zirconium comprising one of the class of metallic zirconium, zirconium tetrachloride, zirconium tetrafluoride, zirconium oxide (preferably one of the latter two), hydrated zirconium oxide and zirconium oxychloride in an excess of substantially anhydrous hydrogen fluoride. Substantially anhydrous hydrogen fluoride means approximately 70 percent by weight HF or better.

(A) The equations of reaction of metallic tin with the feasible zirconium sources comprise:

(1) $Sn+Zr+6HF \rightarrow SnZrF_6+3H_2$
(2) $Sn+ZrCl_4+6HF \rightarrow SnZrF_6+H_2+4HCl$
(3) $Sn+ZrO_2[1]+6HF \rightarrow SnZrF_6+H_2+2H_2O$
(4) $Sn+ZrOCl_2 \cdot 8H_2O+6HF \rightarrow$
$SnZrF_6+H_2+9H_2O+2HCl$
(5) $Sn+ZrF_4+2HF \rightarrow SnZrF_6+H_2$ (B) The equations of reaction of anhydrous stannous chloride with the zirconium sources comprise:

(1) $SnCl_2+Zr+6HF \rightarrow SnZrF_6+2H_2+2HCl$
(2) $SnCl_2+ZrCl_4+6HF \rightarrow SnZrF_6+6HCl$
(3) $SnCl_2+ZrO_2[2]+6HF \rightarrow SnZrF_6+2H_2O+2HCl$
(4) $SnCl_2+ZrOCl_2 \cdot 8H_2O+6HF \rightarrow$
$SnZrF_6+9H_2O+4HCl$
(5) $SnCl_2+ZrF_4+2HF \rightarrow SnZrF_6+2HCl$ (C) The equations of reaction of the hydrated stannous chloride tin source with the zirconium sources are the same as just given with the exception of production of molecules of water or more molecules of water in each case.

(D) The equations of reaction of stannous oxide as a tin source with the zirconium sources comprise:

(1) $SnO+Zr+6HF \rightarrow SnZrF_6+2H_2+H_2O$
(2) $SnO+ZrCl_4+6HF \rightarrow SnZrF_6+H_2O+4HCl$
(3) $SnO+ZrO_2[3]+6HF \rightarrow SnZrF_6+3H_2O$
(4) $SnO+ZrOCl_2 \cdot 8H_2O+6HF \rightarrow$
$SnZrF_6+10H_2O+2HCl$
(5) $SnO+ZrF_4+2HF \rightarrow SnZrF_6+H_2O$ (E) The equations of reaction of $SnF_2$ with the zirconium sources comprise:

(1) $SnF_2+Zr+4HF \rightarrow SnZrF_6+2H_2$
(2) $SnF_2+ZrCl_4+4HF \rightarrow SnZrF_6+4HCl$
(3) $SnF_2+ZrO_2[4]+4HF \rightarrow SnZrF_6+2H_2O$
(4) $SnF_2+ZrOCl_2 \cdot 8H_2O+4HF \rightarrow$
$SnZrF_6+2HCl+9H_2O$
(5) $SnF_2 + ZrF_4 \xrightarrow{(HF)} SnZrF_6$ In all of the following examples of methods by which the present invention may be practiced, the procedure has been essentially as follows: 0.1 gram moles of each of the metal-containing reactants are brought together in the presence of approximately 10 fold excess of substantially anhydrous hydrogen fluoride (70 percent). The reaction is allowed to proceed until it appears to be complete; then the excess HF is boiled off. The initial part of the reaction takes place under conditions where the HF is not rapidly lost, i.e., under a reflux so that the HF is condensed and returned to the reactor. Evidence of completion of a reaction is found in cessation of evolution of HCl in those cases where a chloride was used as a reactant or in ---
[1] Instead of the anhydrous oxide, a hydrated form may be used.
[2] Instead of the anhydrous oxide, a hydrated form may be used.
[3] Instead of the anhydrous oxide, a hydrated form may be used.
[4] Instead of the anhydrous oxide, a hydrated form may be used.

disappearance of the metal when metallic tin or metallic zirconium was used. In some cases, such as when $ZrF_4$ or $ZrO_2$ is used, it was difficult to determine just when the reaction had been completed but a time of approximately three hours was considered to be sufficient. In some cases, as will be indicated under the different examples, the product was analyzed with the results as given under the individual examples, but as a more reliable method of proving that we did have $SnZrF_6$ rather than a mixture of $SnF_2$ and $ZrF_4$, X-ray analyses were made. The pattern obtained from each product was compared with that taken as standard—a preparation analyzed to have composition closely approximating that required by the formula $SnZrF_6$, being free of $SnF_2$ and $ZrF_4$ as shown by absence of X-ray diffraction lines characteristic of these compounds, and having been made by a procedure which has been repeated many times, namely, that of reacting stannous fluoride and zirconium tetrachloride in admixture with anhydrous HF until all of the HCl was evolved. In addition to chemical or X-ray analyses, the weight of the dried product after evolution of all excess HF is of significance and in most cases below is reported. The theoretical yield of $SnZrF_6$ from 0.1 gram moles of the metal-containing reactants is 32.4 grams.

EXAMPLE I (Sn)

$$Sn + Zr + 6HF \rightarrow SnZrF_6 + 3H_2$$

The metals (finely divided) reacted rapidly and the hydrogen produced carried off an excessive amount of HF so additional HF had to be added. A white precipitate was obtained upon evaporating off the balance of the HF but this white precipitate retained some unreacted metallic zirconium and this was removed by treatment with an additional lot of hydrogen fluoride. The product weighed 32 grams. The X-ray pattern corresponded closely with that of standard $SnZrF_6$.

EXAMPLE II (Sn)

$$Sn + ZrCl_4 + 6HF \rightarrow SnZrF_6 + H_2 + 4HCl$$

This mixture of $Sn + ZrCl_4$ reacted rapidly with the HF to release HCl. On the first recovery by evaporation of the excess HF, it was found that the powder was gray, indicating residual metallic tin and, therefore, a second treatment was then made which resulted in a white product weighing 32.4 grams. This product was completely soluble and showed the X-ray pattern characteristic of $SnZrF_6$. (soluble in water).

EXAMPLE III (Sn)

$$Sn + ZrO_2{}^5 + 6HF \rightarrow SnZrF_6 + H_2 + 2H_2O$$

When the HF was added to the mixture of tin powder and zirconium dioxide much heat was evolved and the polyethylene bottle in which the reaction was taking place had to be cooled to prevent its melting. After it seemed the reaction had subsided, the HF was evaporated off to give a product weighing 32.5 grams which was almost completely soluble but showed an X-ray pattern indicating principal products other than $SnZrF_6$. These have not been identified so at present this would be considered a less promising method of making the desired compound.

EXAMPLE IV (Sn)

$$Sn + ZrOCl_2 \cdot 8H_2O + 6HF \rightarrow SnZrF_6 + H_2 + 9H_2O + 2HCl$$

In this experiment much heat was evolved as in Example III on addition of the HF to the mixture of tin powder and $ZrOCl_2 \cdot 8H_2O$. The polyethylene bottle had to be cooled to prevent its destruction because of the heat of reaction. Because of the water released by the hydrated zirconyl chloride, the product had to be dried at a temperature of about 120° C. It was white in color, weighed very close to theoretical 32 grams, was mostly soluble, contained no chloride, gave an X-ray pattern showing in addition to $SnZrF_6$, some $ZrF_4$ and other unidentified materials. (This is considered a less desirable method of preparing the $SnZrF_6$ because of the difficulty in removing all of the water.)

EXAMPLE V (Sn)

$$Sn + ZrF_4 + 2HF \rightarrow SnZrF_6 + H_2$$

Although it was feared that the $ZrF_4$ might not react to give $SnZrF_6$, it did appear to do so inasmuch as the white product weighing 32.3 grams was almost completely soluble in water and did give the lines characteristic of $SnZrF_6$. This was, therefore, considered to be a satisfactory method for preparing the stannous hexafluorozirconate.

EXAMPLE VI ($SnCl_2$)[6]

$$SnCl_2 + Zr + 6HF \rightarrow SnZrF_6 + 2HCl + 2H_2$$

Upon addition of HF to the mixture of zirconium powder and $SnCl_2$, the reaction was very vigorous and much of the HF was lost. Additional HF had to be added to get all of the zirconium dissolved. A light gray colored powder was left which weighed 32.4 grams. The X-ray diffraction pattern indicated $SnZrF_6$ and $ZrF_4$.

EXAMPLE VII ($SnCl_2$)

$$SnCl_2 + ZrCl_4 + 6HF \rightarrow SnZrF_6 + 6HCl$$

The HF was added slowly to the mixture of the two chlorides because of the rapidity with which the HCl was evolved. The reaction was very fast and all of the chloride came off in a matter of minutes. The product was dried to give a white powder having a weight of 32.3 grams. The powder was completely soluble and this appeared to be of good quality $SnZrF_6$. The X-ray examination suggested that there might be some $SnF_2$ in the $SnZrF_6$.

EXAMPLE VIII ($SnCl_2$)

$$SnCl_2 + ZrO_2{}^7 + 6HF \rightarrow SnZrF_6 + 2H_2O + 2HCl$$

In this case, one mole of the anhydrous stannous chloride was reacted with 1 mole of zirconium dioxide with about 600 ml. of anhydrous hydrogen fluoride being present. The HCl was evolved and the product appeared to be $SnZrF_6$. The fluorine content of this was 30.26% (86.0% of theory for $SnZrF_6$) and 32.63% $Sn^{++}$ (89.1% of theory). The low values for fluoride and stannous tin were attributed to some unreacted zirconium dioxide.

EXAMPLE IX ($SnCl_2$)

$$SnCl_2 + ZrOCl_2 \cdot 8H_2O + 6HF \rightarrow SnZrF_6 + 4HCl + 9H_2O$$

Equimolar amounts of anhydrous stannous chloride and zirconium oxychloride, hydrated, were mixed in about 600 mls. of anhydrous HF. The chloride was all evolved and the product dried to give a white powder having 83.8% of the theoretical amount of fluoride for $SnZrF_6$ and 93.2% of theoretical stannous for the stannous hexafluorozirconate.

EXAMPLE X ($SnCl_2$)

$$SnCl_2 + ZrF_4 + 2HF \rightarrow SnZrF_6 + 2HCl$$

This mixture reacted rapidly with HF and the HCl was all evolved within a period of a few minutes. A white powder was formed having a weight of 33 grams and an X-ray diffraction pattern showing principally $SnZrF_6$ with some uncombined $ZrF_4$.

EXAMPLE XI (SnO)

$$SnO + Zr + 6HF \rightarrow SnZrF_6 + 2H_2 + H_2O$$

Because of the vigor of the reaction when the SnO and Zr mixture is wetted with the HF, it was necessary that

---

[5] Example III: A hydrated $ZrO_2$ may be used instead of the anhydrous material used in this experiment.

[6] Example VI: The hydrated stannous chloride may be used instead of the anhydrous $SnCl_2$.

[7] Example VIII. A hydrated zirconium dioxide may be used instead of this anhydrous oxide.

the SnO be dissolved first in the HF and then the zirconium was added carefully to this solution. The zirconium reacts only slowly with the solution of the stannous oxide in the HF and it seemed not to be all dissolved for a period of several hours. Finally, a light gray product was dried having a weight of 32.4 grams but the X-ray diffraction pattern indicated only a low concentration of $SnZrF_6$ with the major portion being $ZrF_4$.

EXAMPLE XII (SnO)

$$SnO + ZrCl_4 + 6HF \rightarrow SnZrF_6 + 4HCl + H_2O$$

One gram mole (134.7 grams) of stannous oxide and 1 gram mole (233.1 grams) of zirconium tetrachloride were mixed and about 600 ml. of HF was added to get a vigorous reaction wherein HCl was released and a white product was obtained having the analysis of 37.34% F (106.1% of theory for $SnZrF_6$) and 34.47% stannous tin (87.1% of theory for $SnZrF_6$).

EXAMPLE XIII (SnO)

$$SnO + ZrO_2{}^8 + 6HF \rightarrow SnZrF_6 + 3H_2O$$

One gram mole of stannous oxide was reacted with a gram mole (123.2 grams) of zirconium oxide with about 600 ml. of anhydrous HF. When the reaction appeared to be complete, the excess HF was vaporized and a white solid was obtained having an analysis for fluoride corresponding to 92.8% of theory and for the stannous tin 91.2% of theory.

EXAMPLE XIV (SnO)

$$SnO + ZrOCl_2 \cdot 8H_2O + 6HF \rightarrow SnZrF_6 + 10H_2O + 2HCl$$

The SnO and hydrated zirconyl chloride were mixed together and the HF was added. Much heat was produced and the bottle had to be cooled to prevent its melting. When the reaction finally ceased, the liquid was boiled off, the white product weighed 33 grams and by X-ray diffraction was found to contain $SnZrF_6$ and a considerable amount of $ZrF_4$.

EXAMPLE XV (SnO)

$$SnO + ZrF_4 + 2HF \rightarrow SnZrF_6 + H_2O$$

After the black stannous oxide had appeared to all react, the excess HF was vaporized off, the product was dried to give a white solid which weighed 33 grams. It was soluble in water, and gave an X-ray pattern indicating the presence of an appreciable amount of $SnZrF_6$.

EXAMPLE XVI ($SnF_2$)

$$SnF_2 + Zr + 4HF \rightarrow SnZrF_6 + 2H_2$$

When HF was added to the mixture of powdered zirconium metal and stannous fluoride, much heat was evolved. The polyethylene bottle in which the reaction took place was melted and had to be replaced. In a second trial the stannous fluoride was first dissolved in the HF. To this solution of stannous fluoride in HF, zirconium metal was slowly added. After all of the zirconium was added and apparently dissolved, the excess HF was evaporated and the product was dried, 31 grams of solid remained, which by X-ray was found to be largely $ZrF_4$ with only a relatively small amount of $SnZrF_6$.

EXAMPLE XVII ($SnF_2$)

$$SnF_2 + ZrCl_4 + 4HF \rightarrow SnZrF_4 + 4HCl$$

The stannous fluoride and zirconium tetrachloride were mixed with the HF being added very slowly because of the rapidity with which the HCl was evolved. When all of the HCl was out, the mixture was taken to dryness, a fine white powder was left which weighed 32 grams and gave X-ray diffraction pattern characteristic of good quality $SnZrF_6$.

EXAMPLE XVIII ($SnF_2$)

$$SnF_2 + ZrO_2{}^9 + 4HF \rightarrow SnZrF_6 + 2H_2O$$

---
[8] Example XIII. Hydrated zirconium dioxide may be used.
[9] Example XVIII. Hydrated $ZrO_2$ may be used.

Upon addition of the HF to the mixture of the two solids, much heat was evolved and the reaction, therefore, appeared to be taking place. When it seemed no more reaction was occurring, the excess HF was evolved to get a dry white powder weighing 32.3 grams which showed only a relatively low concentration of the desired product, $SnZrF_6$.

EXAMPLE XIX ($SnF_2$)

$$SnF_2 + ZrOCl_2 \cdot 8H_2O + 4HF \rightarrow SnZrF_6 + 2HCl + 9H_2O$$

As in other reactions wherein the hydrated zirconyl chloride is used much heat was evolved and the polyethylene bottle had to be cooled to prevent its destruction. When the reaction had subsided and no more HCl was being evolved, the excess liquid was boiled off to obtain a white solid weighing 32 grams, of complete solubility in water and showing the X-ray pattern characteristic of $SnZrF_6$, as well as $ZrF_4$ and some unknown solid phase.

EXAMPLE XX ($SnF_2$)

$$SnF_2 + ZrF_4 \xrightarrow{(HF)} SnZrF_6$$

There was some doubt about a reaction occurring when the two fluorides were mixed in anhydrous HF; the doubt arose principally from the fact that $ZrF_4$ is no more than slightly soluble in anhydrous HF. However, after allowing these two to be in contact for some time in the anhydrous HF, the solvent was evaporated off and a white product was obtained which weighed 31.9 grams and was shown by X-ray to be principally $SnZrF_6$.

Summary

In the above-listed reactions, where HCl is a reaction by-product, the insolubility of same in AHF avoids contamination by a by-product and also provides a driving force toward completion of the reaction. The insolubility of $SnZrF_6$ in AHF is also a driving force in all cases where the water content is low; when water is produced in the reaction an excess of HF may be employed to prevent dissolution of product, $SnZrF_6$ being very soluble in water. Dilution of HF, as will occur where water is formed or introduced may prevent complete recycling of the excess HF as is otherwise possible. Hydrogen as a reaction by-product is advantageous in that it is insoluble and thus promotes the reaction. Further, it assures a reducing environment in the solution.

All of the reactants are to be brought together in a reaction medium of essentially anhydrous hydrogen fluoride. The hydrogen fluoride acts as a reaction medium and in almost every case also as a reactant. The tin may come from any compound or the element itself, if such a substance is soluble in or reacts with anhydrous hydrogen fluoride, except in those cases where the tin is already in the tetravalent state or may be oxidized to that state by something else in the reaction mixture. Likewise, the zirconium may come from the element itself or from any source which will permit reaction to give the $ZrF_4$ compound or the $ZrF_6{}^{--}$ ion. The limitation on the source of the zirconium other than that of reactivity is that of producing in the reaction mixture an environment which will oxidize the tin to the stannic condition.

The combination of the $Zr^{4+}$ ion to give the $ZrF_6{}^{--}$ ion so that $SnZrF_6$ comes out of solution rather than $ZrF_4$ appears novel and unexpected. The precipitation of the $Sn^{++}$ as $SnZrF_6$ rather than $SnF_2$ staying in solution, as it is known to be very soluble in AHF, is also novel and unexpected. The insolubility of $SnZrF_6$ in AHF should be emphasized. That is, it is a surprising fact that this new salt is insoluble in AHF although very soluble in water.

With respect to tin sources, the powdered metal is attractive because of the low cost of the tin in this form and further because of the reducing atmosphere produced by the dissolution of the metal in anhydrous HF.

Stannous oxide on the other hand, is less attractive both because of its higher cost and because it eventually reduces the concentration of the HF through the production of water. This reduces the reactivity of the HF and eventually makes it more corrosive to the equipment. The anhydrous stannous chloride is rather attractive because of its relatively low cost and because of ready expulsion of HCl. The hydrated stannous chloride has the disadvantage of higher cost and of having water in its composition which causes dilution of the AHF. Stannous fluoride is an attractive source of tin, as well as part of the F. This is particularly true in the case where production of stannous fluoride is on a large scale and production of stannous hexafluorozirconate is on a much smaller scale. Thus, it may be cheaper and more convenient to merely take some of the stannous fluoride from that production rather than starting with an unfluorinated tin.

With respect to zirconium sources, zirconium metal is not attractive as a source of the zirconium portion of the stannous hexafluorozirconate because of its high cost. Zirconium oxide is one of the preferred sources of this element as it is low in cost, but it does have a disadvantage in being slowly and possibly incompletely soluble depending on its ancestry. If the zirconium oxide has been heated to a rather high temperature, it will be only slightly or slowly soluble. Zirconium tetrachloride is at present considered to be the most desirable as the agent because of the rapidity with which it does react with HF to release its chloride as HCl and furthermore, its cost is not exorbitant. The zirconyl chloride is highly hydrated and more costly, therefore not relatively attractive.

TYPICAL COSTS OF TIN AND OF ZIRCONIUM IN VARIOUS FORMS

| | $/lb. material | $/lb. metal |
|---|---|---|
| A—Tin: | | |
| 1. As powdered high purity metal (100% Sn) | 1.53 | 1.53 |
| 2. As stannous oxide (88.1% Sn) | 1.89 | 2.15 |
| 3. As anhydrous stannous chloride (62.5% Sn) | 1.28 | 2.05 |
| 4. As stannous chloride, dihydrate (52.6% Sn) | 1.39 | 2.64 |
| 5. As stannous flouride (75.7% Sn) | 2.12 | *2.80 |
| B—Zirconium: | | |
| 1. As powdered metal (100% Zr) | 10.50 | 10.50 |
| 2. As zirconium oxide (74% Zr) | 0.48 | 0.65 |
| 3. As zirconium tetrachloride (39.1% Zr) | 0.40 | 1.02 |
| 4. As zirconyl chloride (28.3% Zr) (from $ZrOCl_2 \cdot 8H_2O$) | 0.40 | 1.41 |
| 5. As zirconium tetrafluoride (54.5% Zr) | 7.50 | *13.76 |

*These cost figures disregard value of the F content and the possible advantages of having the fluoride already formed.

Substantially anhydrous hydrogen fluoride means approximately 70 percent by weight HF or better.

From the foregoing it will be seen that this invention is one well adapted to attain all of the ends and objects hereinabove set forth together with other advantages which are obvious and which are inherent to the process.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth is to be interpreted as illustrative and not in a limiting sense.

Having thus described our invention, we claim:

A process of producing stannous hexafluorozirconate comprising
  adding together in a reaction step, in a substantial excess of substantially anhydrous HF and under conditions preventing loss of HF from said reaction step,
  substantially stoichiometric quantities of a source of zirconium selected from one of the group consisting of zirconium metal, zirconium tetrachloride, zirconyl chloride, zirconium oxychloride, zirconium tetrafluoride and zirconium oxide,
  and a source of tin selected from the group consisting of powdered metallic tin, stannous chloride, stannous fluoride and stannous oxide,
  so that a dry precipitated reaction product containing solid stannous hexafluorozirconate is obtained upon removal of excess HF from the said reaction step,
  and thereafter, following said HF removal, separating said stannous hexafluorozirconate from impurities and unreacted components of said reaction step.

References Cited

Chem. Abstracts, vol. 56, pp. 8277, 8278.

J. W. Mellor: "A Comprehensive Treatise on Inorganic and Theoretical Chemistry," vol. 7, 1927 ed., p. 424. Longmans, Green & Co., New York.

Jacobson's "Encyclopedia of Chemical Reactions," vol. 8, 1949 ed., p. 251, Reinhold Pub. Corp., New York.

OSCAR R. VERTIZ, *Primary Examiner.*

EDWARD STERN, MILTON WEISSMAN, *Examiners.*